Patented May 19, 1953

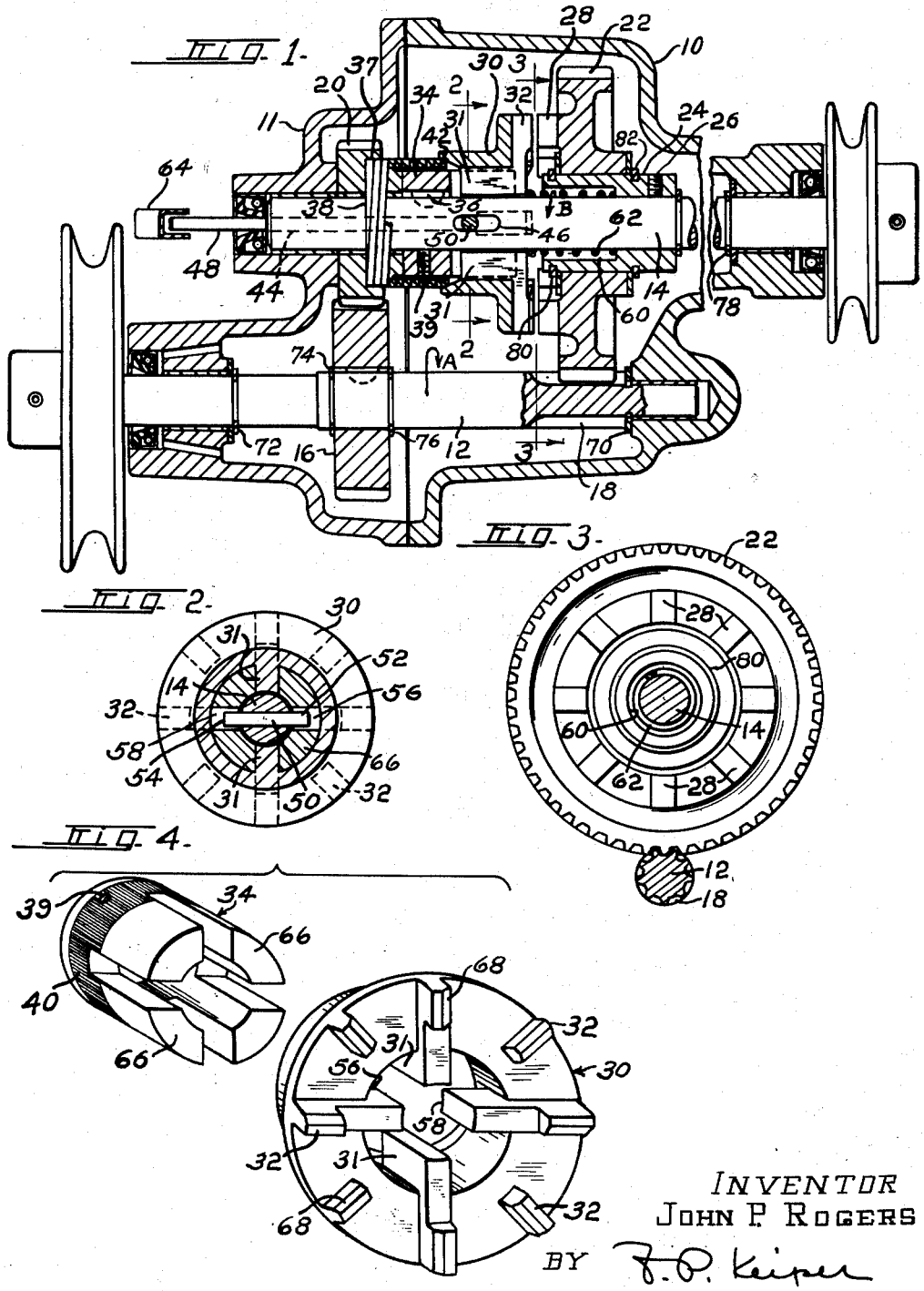

2,638,791

UNITED STATES PATENT OFFICE 2,638,791

TRANSMISSION

John P. Rogers, Liverpool, N. Y., assignor to Easy Washing Machine Corporation, Syracuse, N. Y., a corporation of Delaware Application February 14, 1952, Serial No. 271,474

5 Claims. (Cl. 74—368)

This invention relates to transmissions, and particularly a reversible transmission adapted to deliver two speeds.

In an application Serial No. 174,536, filed July 18, 1950, there is disclosed a transmission adapted to deliver two speeds in one direction, and a single speed when reversely operated, the transmission being actuated by a single control movement. The present invention is directed to an improvement thereover in which a combined jaw clutch and single overrunning clutch are employed for changing the output speed and for providing a reverse drive. The present invention is directed toward providing for a more rugged, positive and simplified construction, avoiding the use of a multiplicity of overrunning clutches, in which speed selection is attained by a single movement of a common clutch actuator.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1 is a longitudinal sectional view of the transmission, several turns of the helical spring being shown in elevation;

Figure 2 is a transverse section taken substantially on the line 2—2 of Figure 1;

Figure 3 is a transverse sectional view taken substantially on the line 3—3 of Figure 1; and Figure 4 is an exploded perspective view of one of the clutch elements and its splined collar.

Referring to Figure 1, there is shown a casing formed in two parts, 10 and 11, having journaled therein a drive shaft 12 and a driven shaft 14, the shafts being in parallel spaced relation with one another. Mounted on the drive shaft 12 and keyed thereto is a high speed gear 16, and formed integral with the shaft is a low speed pinion 18. In constant mesh with the high speed gear 16 is a driven gear 20 mounted upon the shaft 14 and adapted to rotate freely thereon. The low speed pinion 18 is in constant mesh with a low speed driven gear 22 journaled for free rotation upon a collar sleeve 24 secured to the driven shaft 14 by a set screw as at 26.

The driven gear 22 is provided on its left hand face with a plurality of spaced radial lugs 28 in the form of a jaw clutch, which lugs are adapted to be engaged by a slidable jaw clutch member 30 having mating radial jaw clutch lugs 32. The member 30 is slidably disposed upon the driven shaft 14 and splined as at 31 upon a forked collar member 34 which is keyed to the driven shaft as at 36 and fixed thereto as by a set screw 39. The driven high speed gear 20 has secured to it in a recess 37, a spiral overrunning clutch coil 38, the free end of which extends over the collar portion 40 of the forked collar member 34. The clutch member 30 is provided at one end with an internal conical face 42 adapted to engage the free end of the helical clutch spring 38 in order to cause the same to contract upon the clutch collar surface 40.

To change speed ratios from low to high speed or vice versa, the shaft 14 has an axial bore 44 extending from one end thereof to a central region, at which point there is provided a transverse axial extending slot 46 diametrically disposed through the shaft 14. A control rod 48 extends through the hollow bore 44 and is provided with a T-head or transverse pin member 50 lying within the slot 46. The T-member projects at its opposite ends beyond the shaft diameter as at 52 and 54, and such ends are adapted to engage the end surfaces 56 and 58 of diametrically opposed splines 31 on the clutch member 30. Such end surfaces are cut back axially to provide space for the pin 50. The sleeve collar 24 is provided with a shoulder bore 60 facing toward the clutch member 30, said shoulder bore providing an annular recess for containing a biasing compression spring 62 positioned around the shaft 14, such spring being in compression between the end of the shoulder bore 60 and the splines 31 of the clutch member 30. By the arrangement thus described, it will be seen that the clutch member 30 is normally urged to the left to the position as shown in Figure 1, with the cone face 42 in engagement with the helical overrunning clutch spring 38. The arrangement thus shown normally provides for high speed drive of the driven shaft in the direction of arrow B through the gear train formed by drive and driven gears 16 and 20.

Actuation of the rod 48 to the right through any convenient lever arrangement, as indicated at 64, shifts the clutch member 30 to the right, interengaging the clutch teeth 32 with the teeth 28 on the driven slow speed gear 22. When the clutch teeth are thus engaged, the low speed gear train is adapted to drive the driven shaft at low speed in either direction. It will appear that the forked collar member 34 which is keyed and secured to the driven shaft 14 is driven either by the high speed gear 20 through the overrunning clutch spring 38 in the direction of arrow B, or by the clutch member 30 through the interengaging splines 56, 58, and segmental fork elements 66 on the forked collar member 34 in either direction, the clutch member 30 being driven by teeth 28 and 32 from slow speed gear 22.

In order to facilitate the engagement of the clutch teeth 32 and 28 following high speed rotation of the driven shaft 14 through the overrunning clutch spring 38, the teeth 32 of the clutch member are relieved or beveled as at 68. With the helical overrunning clutch spring extending in the direction shown in Figure 1, high speed drive will be effected when rotation of the drive shaft 12 is in the direction of arrow A, and rotation of the driven shaft in the direction of arrow B. The conical face 42 of the clutch member 30 will frictionally engage the free end of the helical coil 38 and cause the same to contract upon the collar 40 of the forked collar member 34. Should for any reason a power failure occur, by reason of which the drive shaft 12 tends to cease rotation, it will be seen that the driven shaft 14 may continue to rotate, and free wheel with respect to the helical coil spring 38, such spring under such circumstances being caused to overrun and release its grip on the collar 40.

In normal practice, the clutch actuating rod 48 and lever 64 will be actuated to engage low speed drive by a solenoid acting on lever 64, the solenoid being supplied by power from the same source that power is derived from to drive the main drive shaft 12. Thus, it will appear that when low speed drive is effected by interengagement of the clutch teeth 32 and 28 through energization of the solenoid referred to, such drive will continue so long as no power failure occurs. In the event of a power failure, it will be seen that by reason of the bias of the coil spring 62 upon the clutch member 30, low speed drive will be immediately disconnected. Should the drive at the time be in the direction corresponding to that resulting from rotation of the driven shaft in the direction of arrow B, the driven shaft will again be permitted to overrun with respect to the high speed gear train gear 20.

The drive shaft is maintained centered in its bearings by split thrust rings 70 and 72, and the drive gear 16 may also be located between split rings 74 and 76. The driven shaft is maintained centered by the forked collar 34 bearing through driven gear 20 and a split ring 78 at the opposite end. The gear 22 is located on the sleeved collar 24 between split rings 80 and 82. In practice, the clutch member 30, by reason of its complex structure, may be readily formed by sintered copper bearing powdered iron. Also in practice, the drive gear 16 may be fibre for quiet operation, and if desired, the teeth on driven gear 22 may be constituted by a fiber ring carried by the hub structure and helical cut teeth may be employed in either gear train.

The transmission is especially designed for use in an automatic washing machine drive, where forward and reverse rotation are required at low speed, and rotation in one direction required at high speed.

While a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. In a two-speed transmission, a housing, spaced parallel drive and driven shafts journaled in said housing, a high speed gear train and a low speed gear train having driving gears keyed on said drive shaft and driven gears freely rotatably mounted on said driven shaft, a member slidably mounted on said driven shaft between the driving gears of said gear trains and keyed for rotation with the driven shaft, said member and the driven gear of said low speed gear train having interengageable jaw clutch teeth engaged by moving said member toward the low speed gear train, normally disengaged overrunning clutch means for coupling said high speed driven gear to said driven shaft, and means carried by said member for initially engaging said overrunning clutch upon movement of said member toward said high speed gear train.

2. In a two-speed transmission, a housing, spaced parallel drive and driven shafts journaled in said housing, a high speed gear train and a low speed gear train having driving gears keyed on one of said shafts and driven gears freely rotatably mounted on the other shaft, a member slidably mounted on said last-named shaft between said gear trains and keyed for rotation with said last-named shaft, said member and the gear coaxial therewith on said last-named shaft of said low speed gear train having interengageable jaw clutch teeth engaged by moving said member toward the low speed gear train, normally disengaged overrunning clutch means for coupling the high speed gear on said last-named shaft, and means carried by said member for initially engaging said overrunning clutch upon movement of said member toward said high speed gear train.

3. In a two-speed transmission, a housing, spaced parallel drive and driven shafts journaled in said housing, a high speed gear train and a low speed gear train having driving gears keyed on said drive shaft and driven gears freely rotatably mounted on said driven shaft, said shaft having an axial bore and transverse connecting aperture, a clutch collar member slidably mounted on said driven shaft adjacent said connecting aperture and between the driving gears of said gear trains and keyed for rotation with the driven shaft, said collar member and the driven gear of said low speed gear train having interengageable jaw clutch teeth engaged by moving said collar member toward the low speed gear train, means for yieldingly biasing said member for movement away from said low speed gear train, normally disengaged overrunning clutch means for coupling said high speed driven gear to said driven shaft, means carried by said member for initially engaging said overrunning clutch upon movement of said collar member toward said high speed gear train, and axially movable means extending through said bore and having a transverse member lying in said connecting aperture, said transverse member engaging said collar member for axial actuation thereof against said biasing means.

4. In a two-speed transmission, a housing, spaced parallel drive and driven shafts journaled in said housing, a high speed gear train and a low speed gear train having driving gears keyed on one of said shafts and driven gears freely rotatably mounted on the other shaft, said shaft having an axial bore and transverse connecting aperture, a clutch collar member slidably mounted on said last-named shaft adjacent said connecting aperture and between said gear trains and keyed for rotation with said last-named shaft, said collar member and the gear coaxial therewith on said last-named shaft of said low speed gear train having interengageable jaw clutch teeth engaged by moving said collar member toward the low speed gear train, means for yieldingly biasing said member for movement away from said low speed gear train, normally disengaged overrunning clutch means for coupling the high speed gear on said last-named shaft, means carried by said member for initially engaging said overrunning clutch upon movement of said collar member toward said high speed gear train, and axially movable actuating means extending through said bore and having a transverse member lying in said connecting aperture, said transverse member engaging said collar member for axial actuation thereof against said biasing means.

5. A shaft assembly for a two-speed transmission comprising a shaft having an axial bore extending from one end to a central portion thereof and a transverse central connecting aperture, an abutment collar keyed to said shaft on one side of said aperture, an overrunning clutch drive collar keyed to said shaft on the other side of said aperture, an axially shiftable collar, splined for rotation with said shaft mounted between said collars, said member having jaw clutch teeth on one side and overrunning clutch actuating means on the other, a gear rotatable on said abutment collar having jaw clutch teeth adapted to mate with said member teeth, a gear rotatable on said shaft adjacent said drive collar and having a helical overrunning clutch spring secured thereto and extending over said collar toward the overrunning clutch actuating means of said member, a compression coil spring on said shaft between said member and abutment collar, biasing said member in one direction, and actuating means having a transverse member engaging bar on its end lying in said bore and aperture, adapted to move said member against said spring.

JOHN P. ROGERS.

References Cited in the file of this patent

UNITED STATES PATENTS

| Number | Name | Date |
|---|---|---|
| 2,140,975 | Welch | Dec. 20, 1938 |
| 2,156,698 | Martin | May 2, 1939 |
| 2,191,609 | Dodge | Feb. 27, 1940 |
| 2,456,600 | Trout | Dec. 14, 1948 |